United States Patent
Sarmento et al.

(10) Patent No.: US 10,026,107 B1
(45) Date of Patent: Jul. 17, 2018

(54) GENERATION AND CLASSIFICATION OF QUERY FINGERPRINTS

(71) Applicant: Amazon Technologies, Inc., Reno, NV (US)

(72) Inventors: Luis Antonio Diniz Fernandes de Morais Sarmento, Seattle, WA (US); Lisa Jane Hinegardner, Issaquah, WA (US); Thomas Jay Hoover, Seattle, WA (US); Alexander Michael Spinelli, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 778 days.

(21) Appl. No.: 14/217,003

(22) Filed: Mar. 17, 2014

(51) Int. Cl.
  *G06Q 30/06* (2012.01)
(52) U.S. Cl.
  CPC .................................. *G06Q 30/06* (2013.01)
(58) Field of Classification Search
  CPC ...................................................... G06Q 30/06
  USPC ......................................................... 705/26.1
  See application file for complete search history.

(56) References Cited

U.S. PATENT DOCUMENTS

| 9,116,952 | B1 | 8/2015 | Heiler et al. |
|---|---|---|---|
| 2002/0198882 | A1 | 12/2002 | Linden et al. |
| 2005/0050021 | A1 | 3/2005 | Timmons |
| 2006/0224571 | A1 | 10/2006 | Leon et al. |
| 2007/0038601 | A1 | 2/2007 | Guha et al. |
| 2007/0067304 | A1* | 3/2007 | Ives ........................ G06Q 30/02 |
| 2007/0088729 | A1 | 4/2007 | Baca et al. |
| 2007/0220365 | A1 | 9/2007 | Castellani et al. |
| 2007/0250514 | A1 | 10/2007 | Rajput et al. |
| 2007/0266002 | A1 | 11/2007 | Chowdhury et al. |
| 2008/0228685 | A1 | 9/2008 | Shivaji-Rao et al. |
| 2010/0171993 | A1* | 7/2010 | Longobardi ...... G06F 17/30011 358/403 |
| 2011/0202522 | A1 | 8/2011 | Ciemiewicz et al. |
| 2011/0288909 | A1* | 11/2011 | Hedley .............. G06Q 30/0283 705/13 |

(Continued)

OTHER PUBLICATIONS

Zhu et al., "Determining and Satisfying Search Users Real Needs via Socially Constructed Search Concept Classification", IEEE International Conference on Digital Ecosystems and Technologies (IEEE DEST 2007) Cairns Australia, Feb. 21-23, 2007, pp. 404-409.

(Continued)

*Primary Examiner* — Mila Airapetian
(74) *Attorney, Agent, or Firm* — Kilpatrick Townsend & Stockton LLP

(57) ABSTRACT

A method and system for analyzing user behavior as users search for items within an electronic marketplace is provided. A query is submitted by a user of the electronic marketplace, the query is processed to identify a series of actions or behaviors performed by the user in relation to the query and fingerprint information for the query is determined based at least in part on analyzing the actions. A classification for a query is determined based on the fingerprint information. In one embodiment, an electronic marketplace receives a query from a user, accesses a query classification database having fingerprint information, determines a fingerprint for the query based on the fingerprint information and dynamically modifies a user experience for the user based at least in part on the fingerprint information.

20 Claims, 10 Drawing Sheets

(56) References Cited

U.S. PATENT DOCUMENTS

| | | | |
|---|---|---|---|
| 2011/0295824 A1 | 12/2011 | Schneider et al. | |
| 2012/0054194 A1* | 3/2012 | Gao | G06F 17/30964 707/741 |
| 2012/0093354 A1* | 4/2012 | Kletter | G06K 9/00456 382/100 |
| 2012/0215664 A1 | 8/2012 | Dalal et al. | |
| 2012/0303624 A1* | 11/2012 | Gandhi | G06F 17/2785 707/740 |
| 2013/0055367 A1 | 2/2013 | Kshirsagar et al. | |
| 2013/0246383 A1 | 9/2013 | White et al. | |
| 2014/0279265 A1 | 9/2014 | Bhardwaj et al. | |
| 2014/0372253 A1 | 12/2014 | Arunachalam et al. | |
| 2015/0142565 A1* | 5/2015 | Wang | G06Q 30/0256 705/14.54 |
| 2015/0227557 A1 | 8/2015 | Holzschneider et al. | |

OTHER PUBLICATIONS

U.S. Appl. No. 14/290,822, filed May 29, 2014, Titled: Generating Category Layouts Based on Query Fingerprints.
U.S. Appl. No. 14/290,826, filed May 29, 2014, Titled: Generating Modified Search Results Based on Query Fingerprints.
U.S. Appl. No. 14/290,829, filed May 29, 2014, Titled: Category Ranking on Query Fingerprints.
U.S. Appl. No. 14/217,021, filed Mar. 17, 2014, Titled: Identifying Query Fingerprints.
U.S. Appl. No. 14/217,036, filed Mar. 17, 2014, Titled: Modifying User Experience Using Query Fingerprints.

* cited by examiner

GENERATION AND CLASSIFICATION OF QUERY FINGERPRINTS

CROSS-REFERENCE TO RELATED APPLICATIONS

This application is related to and incorporates by reference for all purposes the full disclosures of U.S. patent application Ser. No. 14/217,021, filed Mar. 17, 2014, and issued as U.S. Pat. No. 9,727,614 on Aug. 8, 2017, entitled "IDENTIFYING QUERY FINGERPRINTS"; U.S. patent application Ser. No. 14/217,036, filed Mar. 17, 2014, and issued as U.S. Pat. No. 9,720,974 on Aug. 1, 2017, entitled "MODIFYING USER EXPERIENCE USING QUERY FINGERPRINTS"; U.S. patent application Ser. No. 14/290,822, filed May 29, 2014, and issued as U.S. Pat. No. 9,747,628 on Aug. 29, 2017, entitled "GENERATING CATEGORY LAYOUTS BASED ON QUERY FINGERPRINTS"; U.S. patent application Ser. No. 14/290,826, filed May 29, 2014, and issued as U.S. Pat. No. 9,760,930 on Sep. 12, 2017, entitled "GENERATING MODIFIED SEARCH RESULTS BASED ON QUERY FINGERPRINTS"; and U.S. patent application Ser. No. 14/290,829, filed May 29, 2014, entitled "CATEGORY RANKING BASED ON QUERY FINGERPRINTS".

BACKGROUND

It has become common for merchants to utilize an electronic forum that provides users with the ability to view and/or purchase items using an electronic catalog of items. As an example, users may view information related to an item in an electronic catalog by simply submitting a search query for the item via a search engine. The search query may typically include a set of words or phrases that a user enters when looking for information about a specific item. Oftentimes it is not easy for a user to choose query terms that specifically represent information about an item. As a result, users tend to modify their initial queries and submit new ones that more accurately reflect their information needs. In addition, users may also narrow or broaden their queries during a search session in the hope of getting better search results.

BRIEF DESCRIPTION OF THE DRAWINGS

Various embodiments in accordance with the present disclosure will be described with reference to the drawings, in which:

FIG. 7 is a schematic diagram depicting an example graphical user interface by which a user can search for an item within an electronic marketplace, described herein.

FIG. 8 is a schematic diagram depicting an example graphical user interface by which a user can search for an item within an electronic marketplace, described herein.

DETAILED DESCRIPTION

Figure 1:
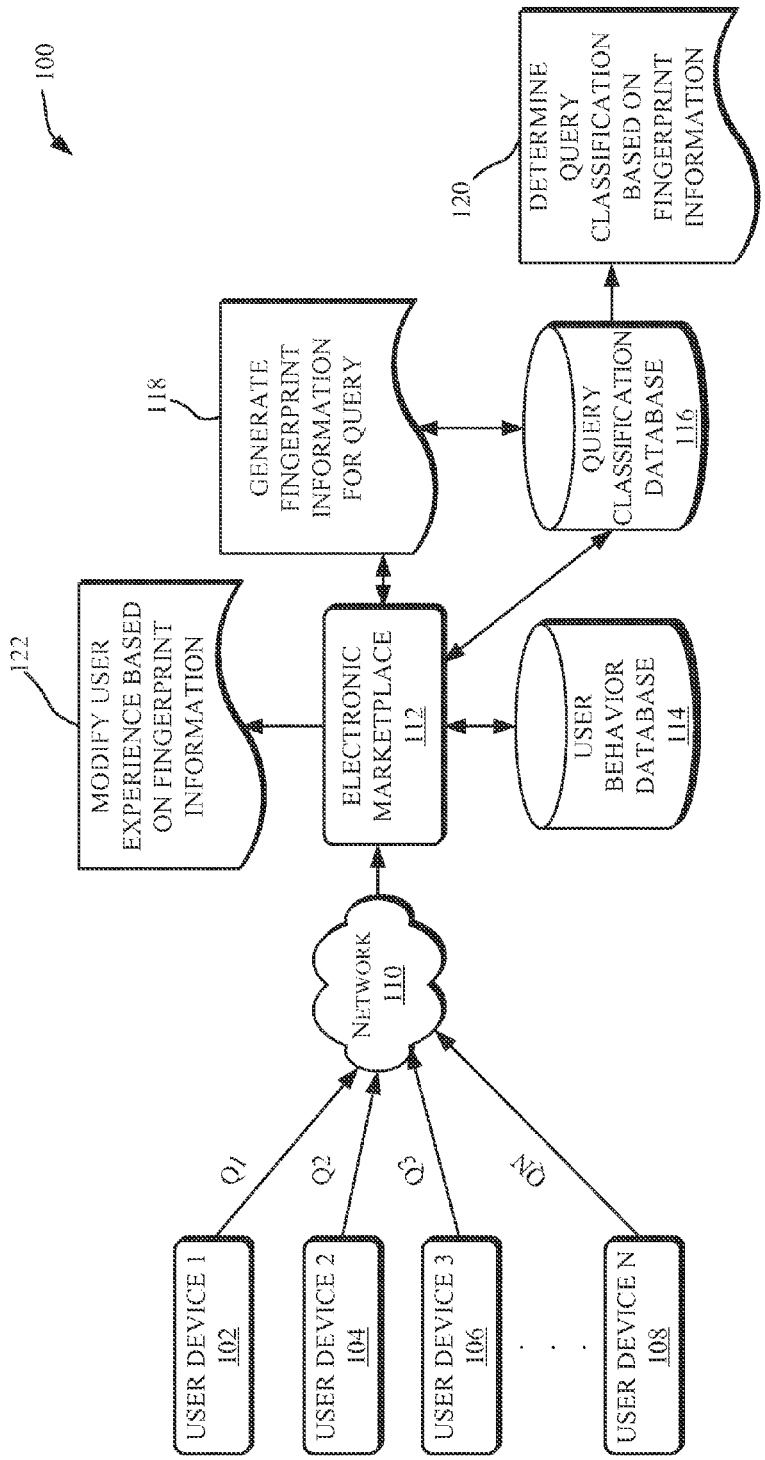
FIG. 1 depicts aspects of an example system architecture 100 in accordance with at least one embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Some or all of the processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Techniques described herein include a method and system for analyzing user behavior as a user searches for items, for example within an electronic marketplace. In accordance with at least one embodiment, a query is submitted by a user of the electronic marketplace, the query is processed to identify one or more actions or behaviors performed by the user in relation to the query, and fingerprint information for the query is determined based at least in part on the query and the one or more actions or behaviors.

In some examples, the actions performed by a user in relation to a query may include, without limitation, a re-formulation of the query, a term swap, a term addition, a term deletion, an abandonment of the query, an item detail page click, a refinement of the query, a scope change of the query, and the like. For example, a re-formulation, a refinement or a scope change of a query may include a modification to search terms of the query by the user. Similarly, a term addition may include the addition of one or more search terms to a query. A term deletion may include the removal of one or more search terms to a query. An item detail page click may include the selection of an item in the electronic catalog by the user, to view details about the item. As an example, an item detail page may include details that characterize an item offered for sale in the electronic marketplace and may include information that assists users (e.g., buyers) to decide between multiple alternative offers related to the item. Query abandonment may include an abandonment of the query by the user.

In accordance with at least one other embodiment, a plurality of fingerprints are analyzed to form a classification system or database of fingerprints. In one embodiment, a fingerprint for a query may be represented as a vector of features comprising fingerprint information. The fingerprint information may, in some examples, identify one or more actions performed by users in relation to a query during a search session. In other examples, the fingerprint information may also identify time information. The time information may, in some examples, represent an average amount of time spent by one or more users while browsing for information during a search session. Using this classification system or database, a new query can be classified within the classification system and handled accordingly, for example by anticipating actions of a user that submitted the query, and modifying the user's experience accordingly.

In one example, a classification for a query may be determined based at least in part on computing a similarity measure between fingerprint information of the submitted query and the fingerprint information within the classification system. In embodiments, to classify a query, the query itself and/or actions taken with respect to the query may be evaluated with respect to fingerprints in the classification system. For example, a classification for a query may be determined based at least in part on computing the length of time that a user stays in the electronic marketplace website during a search session related to the query. In some examples, the classification for a query may also be based on the amount of time that users stayed on a particular network page of the electronic marketplace website after issuing a query and before performing a subsequent action that navigated the users to a new network page on the website.

In certain embodiments, a user may, via a computing device, submit a search query for an item to a search engine provided by an electronic marketplace website. The electronic marketplace may receive the query submitted by the user and access a classification database having fingerprint information. In one example, the electronic marketplace may then determine fingerprint information for the query by comparing the fingerprint information in the classification database to an action performed by the user in relation to the query. In one embodiment, the electronic marketplace may then determine a classification for the query based on the fingerprint information. In some embodiments, the electronic marketplace may modify a user experience for the user based at least in part on the fingerprint information.

In at least one-limiting example, a user on a computing device accesses an electronic marketplace website via a browser application on the computing device by submitting a query (e.g., 'Shoes') via a search interface provided by the electronic marketplace website. While querying for information related to the item 'Shoes', the user performs a series of actions in relation to the query such as re-formulating the query, adding a term to the query, deleting a term from the query, clicking on an item detail page associated with the item in the electronic marketplace website, re-scoping the query, and/or other actions during a search session. The electronic marketplace identifies the series of actions performed by the user in relation to the query during the search session and generates fingerprint information for the query. In one example, the fingerprint information is represented as a vector of features, in which each feature corresponds to an action performed by the user in relation to the query. The electronic marketplace stores the fingerprint information in a query classification database and determines a classification for the query based on the fingerprint information. In one example, a query submitted by the user may be classified as a 'Broad' query, a 'Well-defined query', a 'Brand query', and the like based on the fingerprint information.

In at least another limiting example, a user submits a query for an item (e.g., 'Games') via a search interface provided by an electronic marketplace website. The electronic marketplace anticipates and then identifies a next action that the user is likely to perform in relation to the query 'Games' by accessing fingerprint information stored in a query classification database. As an example, the electronic marketplace may determine that users who search for the item 'Games' may typically re-formulate their query to, for example, 'Video games' based on the fingerprint information. The electronic marketplace then dynamically modifies the search results presented by the user to include 'Video games' in the search results as the user is searching for the item 'Games.' In some examples, a 'drop down' menu may be dynamically generated to change the appearance of a network page based on the fingerprint information to display different categories of 'Video games' to the user. In other examples, a region with refined search results of various categories of 'Video games' may be dynamically displayed on a network page based on the fingerprint information. Thus, in accordance with at least one embodiment, the electronic marketplace may be configured to generate an enhanced user experience for the user, based at least in part on the fingerprint information for a query submitted by the user.

FIG. 1 depicts aspects of an example system architecture 100 in accordance with at least one embodiment of the present disclosure. The architecture 100 includes an electronic marketplace 112 communicatively connected to one or more user computing devices 102, 104, 106 and 108 via a network 110. The electronic marketplace 112 may present items for sale from one or more sellers and facilitate transactions (e.g., financial transactions) with respect to the items. A user of the electronic marketplace 112 may view and/or order items from the electronic marketplace 112 using one or more of the computing devices 102, 104, 106 and 108. In one embodiment, the electronic marketplace 112 may be hosted by one or more service provider computers, described herein. An exemplary implementation of the electronic marketplace in accordance with at least one embodiment is described below in more detail with reference to FIG. 2.

In architecture 100, one or more users (i.e., electronic marketplace consumers or web browser users) may utilize a browser application or other web application on the user computing devices 102, 104, 106 and 108 to interact with an electronic marketplace website which may be hosted, managed, and/or provided by the electronic marketplace 112, described herein. As an example, users may interact with the electronic marketplace website to search for, browse for, or purchase items from the electronic marketplace 112. As described herein, an item may include a physical item of manufacture, a media item, a digital item (for e.g., music, movie or software), and/or a service (e.g., a virtual computer that provides specific services to users) or other items for purchase or selection via a networked environment.

In accordance with at least one embodiment, the electronic marketplace 112 may be configured to perform one or more operations to receive one or more queries Q1, Q2, Q3 . . . Qn issued by one or more users on user computing devices 102, 104, 106 and 108 and store the queries in a user behavior database 114. In one embodiment, the user behavior database 114 may maintain time-stamped search query histories of search queries submitted by users of the electronic marketplace during a search session. In other examples, the user behavior database 114 may also maintain item browse histories and item purchase histories of users of the electronic marketplace. The item browse histories may identify items selected by users for viewing and indicate the date and time for each such item browse event. The item purchase histories may identify all the items purchased by users of the electronic marketplace and the associated dates of purchase.

In one embodiment, the electronic marketplace 112 may access the search query histories stored in the user behavior database 114 to identify a query submitted by users of the electronic marketplace. The electronic marketplace 114 may then perform one or more operations to identify a series of actions performed by the users in relation to the query during a search session. As mentioned above, the actions may include, for example, a re-formulation of the query, a term swap, a term addition, a term deletion, an abandonment of the query, an item detail page click, a refinement of the query, a scope change of the query, and the like. The electronic marketplace 114 may then generate fingerprint information for the query 118 based at least in part on analyzing the actions.

In certain embodiments, the fingerprint information for each query may be stored in a query classification database 116. In accordance with at least one embodiment, the electronic marketplace 112 may be configured to determine a classification for the query 120 based at least in part on the fingerprint information and store the classification information in the query classification database 116. In one example, a query submitted by the user may be classified as a 'Broad' query, a 'Well-defined query', a 'Brand query', and the like based on the fingerprint information. Additional details regarding the generation and classification of fingerprint information related to queries submitted by users of an electronic marketplace is discussed in detail in relation to FIG. 3.

In accordance with at least another embodiment, the electronic marketplace 112 may be configured to perform one or more operations to evaluate a fingerprint for a query and modify a user experience for the user 122 based on the fingerprint. As an example, the electronic marketplace 112 may receive a first query submitted by a user of a user device (e.g., 102). The electronic marketplace may then access a classification database having fingerprint information. In one example, the electronic marketplace may then determine fingerprint information for the query by comparing the fingerprint information in the classification database to an action performed by the user in relation to the query. In one embodiment, the electronic marketplace may then modify a user experience for the user based at least in part on the fingerprint information. Additional details regarding evaluating a fingerprint for a query modifying a user's experience based on fingerprint information is discussed in detail in relation to FIG. 3.

Figure 2:
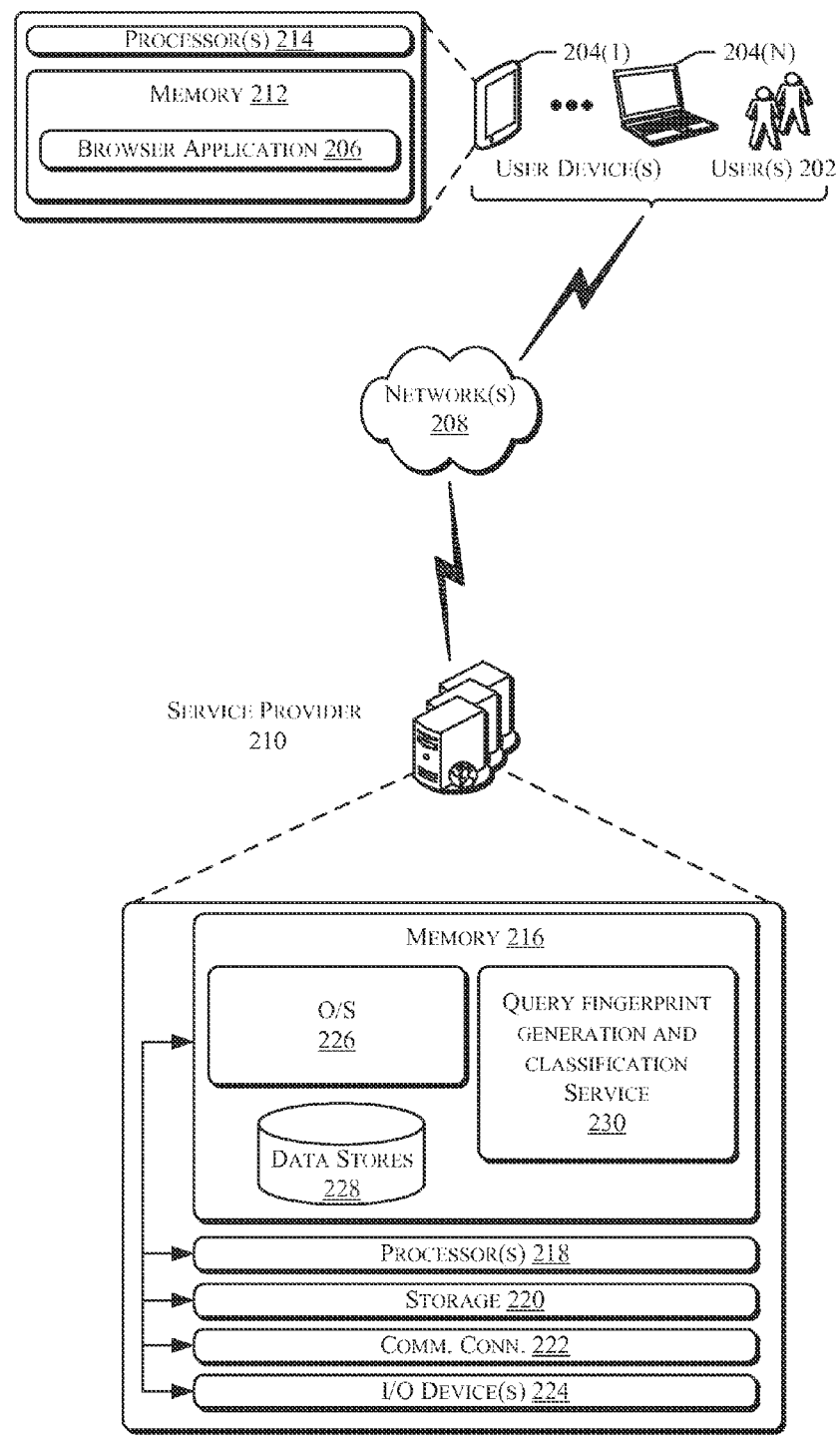
FIG. 2 depicts an illustrative system or architecture 200 that depicts aspects of an electronic marketplace system, described herein.

FIG. 2 depicts an illustrative system or architecture 200 that depicts aspects of an electronic marketplace system, described herein. In architecture 200, one or more users 202 (i.e., electronic marketplace consumers or web browser users) may utilize user computing devices 204(1)-(N) (collectively, user devices 204) to access a browser application 206 (e.g., a web browser) or a user interface accessible through the browser application 206 via one or more networks 208.

In some aspects, the browser application 206 may be configured to receive, store, and/or display a website (e.g., an electronic marketplace website), or other interface on a display screen of the user devices 204. The browser application 206 may be hosted, managed, and/or provided by an electronic marketplace, such as by utilizing the service provider computers 210. In accordance with at least one embodiment, in addition to accessing the browser application 206 to view the electronic marketplace website, the users 202 may also utilize one or more native applications (e.g., a software application program) developed for use on a particular platform compatible with the user devices 204 to access the electronic marketplace website. The one or more service provider computers 210 may, in some examples, provide computing resources such as, but not limited to, data storage, data access, management, virtualization, cloud-based software solutions, electronic content performance management, and the like. The one or more service provider computers 210 may also be operable to provide web hosting, computer application development, and/or implementation platforms, combinations of the foregoing, or the like to the one or more users 202.

In some examples, the networks 208 may include any one or a combination of many different types of networks, such as cable networks, the Internet, wireless networks, cellular networks and other private and/or public networks. While the illustrated example represents the users 202 accessing the browser application 206 over the networks 208, the described techniques may equally apply in instances where the users 202 interact with the service provider computers 210 via the one or more user devices 204 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the browser application 206 may allow the users 202 to interact with the service provider computers 210 (e.g., via the electronic marketplace website), such as to search for, browse for or purchase items offered by the electronic marketplace, described herein. The one or more service provider computers 210, perhaps arranged in a cluster of servers or as a server farm, may host the electronic marketplace website and/or cloud-based software services. Other server architectures may also be used to host the electronic marketplace website and/or cloud-based software services. The browser application 206 may be capable of handling requests from many users 202 and serving, in response, various user interfaces that can be rendered at the user devices. In one example, the browser application 206 may be capable of receiving search queries from one or more users 204, and in response to the search queries, render network content (e.g., a web page) that includes hypertext information (e.g., information formatted in accordance with a hypertext markup language such as HTML) about an item listed (e.g., offered for sale) in an electronic marketplace system. The browser application 206 can also provide any type of website that supports user interaction, including search engine sites. The described techniques may similarly be implemented outside of the browser application 206, such as with other applications running on the user devices 204.

The user devices 204 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user devices 204 may be in communication with the service provider computers 210 via the networks 208, or via other network connections. Additionally, the user devices 204 may be part of the distributed system managed by, controlled by, or otherwise part of the service provider computers 210.

In one illustrative configuration, the user devices 204 may include at least one memory 212 and one or more processing units (or processor(s)) 214. The processor(s) 214 may be implemented as appropriate in hardware, computer-executable instructions, firmware, or combinations thereof. Computer-executable instruction or firmware implementations of the processor(s) 214 may include computer-executable or machine-executable instructions written in any suitable programming language to perform the various functions described.

The memory 212 may store program instructions that are loadable and executable on the processor(s) 214, as well as data generated during the execution of these programs. Depending on the configuration and type of user device 204, the memory 212 may be volatile (such as random access memory (RAM)) and/or non-volatile (such as read-only memory (ROM), flash memory, etc.). The user device 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 212 may include multiple different types of memory, such as static random access memory (SRAM), dynamic random access memory (DRAM), or ROM.

Turning to the contents of the memory 212 in more detail, the memory 212 may include an operating system and one or more application programs, modules, or services for implementing the features disclosed herein, such as via the browser application 206 or dedicated applications (e.g., smart phone applications, tablet applications, etc.). The browser application 206 may be configured to receive, store, and/or display a website (e.g., the electronic marketplace website), or other interface for interacting with the service provider computers 210. In accordance with at least one embodiment, the browser application 206 may receive search queries submitted by the users 202 and provide the search queries to the service provider computers 210. Additionally, the memory 212 may store access credentials and/or other user information such as, but not limited to, user IDs, passwords, and/or other user information.

In some aspects, the service provider computers 210 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in accordance with at least one embodiment, the service provider computers may be executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the service provider computers 210 may be in communication with the user devices 204 and/or other service providers via the networks 208, or via other network connections. The service provider computers 210 may include one or more servers, perhaps arranged in a cluster, as a server farm, or as individual servers not associated with one item detail page rating service described herein as part of an integrated, distributed computing environment.

In one illustrative configuration, the service provider computers 210 may include at least one memory 216 and one or more processing units (or processor(s)) 218. The processor(s) 218 may be implemented as appropriate in hardware, computer-executable instructions, firmware, or combinations thereof. Computer-executable instruction or firmware implementations of the processor(s) 218 may include computer-executable or machine-executable instructions written in any suitable programming language to perform the various functions described.

The memory 216 may store program instructions that are loadable and executable on the processor(s) 218, as well as data generated during the execution of these programs. Depending on the configuration and type of service provider computers 210, the memory 216 may be volatile (such as RAM) and/or non-volatile (such as ROM, flash memory, etc.). The service provider computers 210 or servers may also include additional storage 220, which may include removable storage and/or non-removable storage. The additional storage 220 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 216 may include multiple different types of memory, such as SRAM, DRAM, or ROM.

The memory 216, the additional storage 220, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 216 and the additional storage 220 are all examples of computer storage media. Additional types of computer storage media that may be present in the service provider computers 210 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computers 210. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computers 210 may also contain communications connection(s) 222 that allow the service provider computers 210 to communicate with a stored database, another computing device or server, user terminals and/or other devices on the networks 208. The service provider computers 210 may also include I/O device(s) 224, such as a keyboard, a mouse, a pen, a voice input device, a touch input device, a display, speakers, a printer, etc.

Turning to the contents of the memory 216 in more detail and will be described in further detail in FIG. 3, the memory 216 may include an operating system 226, one or more data stores 228, and/or one or more application programs, modules, or services for implementing the features disclosed herein, including a query fingerprint generation and classification service, 230.

Figure 3:
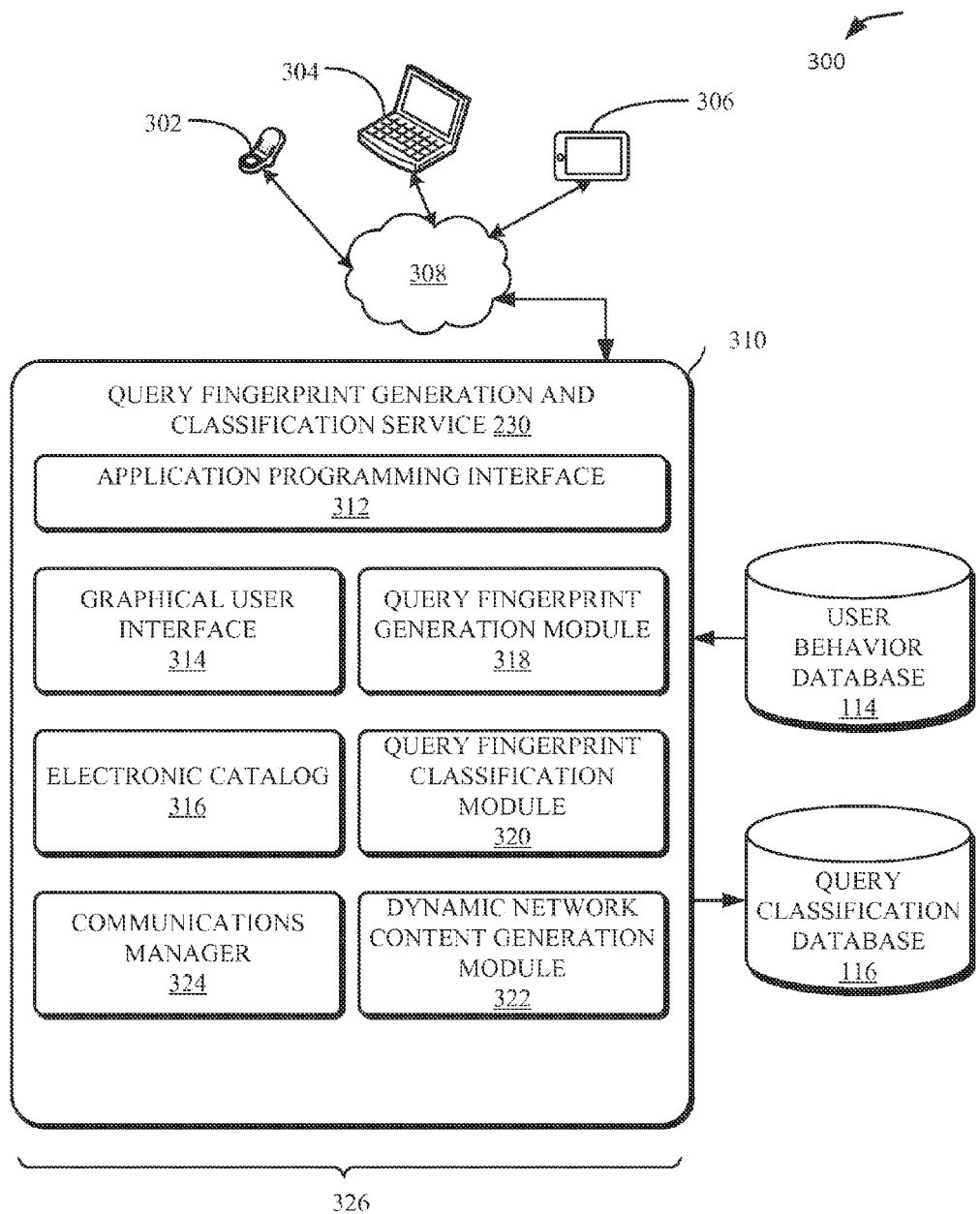
FIG. 3 illustrates an example architecture 300 of a query fingerprint generation and classification service provided by an electronic marketplace 310, in accordance with at least one embodiment of the present disclosure.

FIG. 3 illustrates an example architecture 300 of a query fingerprint generation and classification service provided by an electronic marketplace 310, in accordance with at least one embodiment of the present disclosure. The query fingerprint generation and classification service 230 may include a plurality of modules configured to implement functionality of the query fingerprint generation and classification service, described herein. The modules 326 may be software modules, hardware modules, or a combination thereof. If the modules 326 are software modules, the modules 326 can be embodied on a computer readable medium and processed by a processor in any of the computer systems described herein. It should be noted that any module or data store described herein, may be, in accordance with at least one embodiment, a service responsible for generating fingerprint information for queries related to items issued by users of the electronic marketplace and classifying the generated query fingerprint information. The modules may be configured in the manner suggested in FIG. 3 or may exist as separate modules or services external to the electronic marketplace 310.

In accordance with at least one embodiment, a user may enter and submit search terms into a search query interface via an electronic device communicating with a network 308. The network 308 may be the same or similar as the networks 208 and 110 described above. The electronic device may include, for example, a cell phone 302, a laptop computer 304, or a tablet personal computer 306. User selections may be input by the user or other users, via one of the aforementioned various electronic devices via a web browser application (e.g., 206) on the user's device.

In accordance with at least one embodiment, the query fingerprint generation and classification service 230 may include a graphical user interface 314. The graphical user interface 314 may serve as the back-end component that may be configured to implement the various user interface elements that can be rendered on the user's browser application (e.g., 206) at the user devices. In accordance with at least one embodiment, the graphical user interface 314 may be configured to implement one or more user interface elements to enable users on devices 302, 304 and 306 to interact with the electronic marketplace website while searching for, browsing, or purchasing items via the electronic marketplace 110. As an example, a user may utilize a user interface element to submit a search query to the electronic marketplace. The search query may be received by the communications manager 324 and stored in the user behavior database 114.

In accordance with at least one embodiment, the query fingerprint generation and classification service 230 may include a browsable electronic catalog 316 that is accessible over the network 308 to the users of user devices 302, 304 and 306, via the electronic marketplace website. The electronic catalog 316 may include a database of information about items that may be listed by users within the electronic marketplace system. The information may typically include item IDs, item descriptions and item images provided by manufacturers or distributors of the items. In some examples, information about the items listed in the electronic marketplace system may be viewable by the users of user devices 302, 304 and 306 by browsing the electronic catalog 316 wherein each item may fully be identified within a corresponding item detail page.

In some embodiments, the query fingerprint generation and classification service 230 may include a query fingerprint generation module 318. The query fingerprint generation module 318 may be configured to generate fingerprint information for one or more queries submitted by one or more users of the electronic marketplace. In one embodiment, the query fingerprint generation module 318 may be configured to access search query histories stored in the user behavior database 114 to identify a query submitted by one or more users of the electronic marketplace during a search session. In one embodiment, the query fingerprint generation module 318 may perform one or more operations to identify a 'first action' performed by the users in relation to the query. As an example, the 'first action' may correspond to a 'first query' or an 'initial query' (e.g., 'Shoes) submitted by the users. In some embodiments, the query fingerprint generation module 318 may perform one or more operations to store the 'first action' as fingerprint information associated with the query in the query classification database 116.

In accordance with some embodiments, the query fingerprint generation module 318 may then perform one or more operations to analyze a plurality of actions performed by the users in relation to the query, after the 'first action' and identify a 'subsequent action' based at least in part on the analysis. In one example, a 'subsequent action' may be identified as an action that is performed by a maximum number of users after the 'first action.' As an example, the query fingerprint generation module 118 may identify that a 'subsequent action' performed by a maximum number of users after submitting an initial query, 'Shoes' may be a re-formulation of the query to 'Running Shoes.' In certain embodiments, the query fingerprint generation module 318 may perform one or more operations to store the 'subsequent action' as fingerprint information associated with the query in the query classification database 116.

In some embodiments, the query fingerprint generation module 318 may then perform the operations discussed above to identify additional actions performed by the users after the 'subsequent action'. The actions representing the fingerprint information thus identified may be used to generate a fingerprint for the query. In one embodiment, the fingerprint for the query may be represented as a vector of features, in which each feature in the vector represents an action performed by the users in relation to the query. In one embodiment, the last action in the fingerprint for the query may be identified as an 'exit action', indicating the end of the search session and/or an abandonment of the query by the users.

In some embodiments, the query fingerprint generation module 318 may also be configured to track the amount of time that each user spent browsing for information on a particular network page of the electronic marketplace website after performing a 'first action' and before performing a 'subsequent action' that navigated the users to a second network page on the website. In this embodiment, the query fingerprint generation module 318 may also be configured to store the time information as fingerprint information associated with each action performed in relation to the query.

Thus, in accordance with some embodiments, a fingerprint for a query may be represented by a schema 'S,' the schema comprising one or more attributes or features associated with the query such as time information and one or more actions performed in relation to the query during a search session. Accordingly, a fingerprint for a query may be represented by a schema 'S' as: (<average_amount_of_time_spent_on_page>, <action>), where <action> represents either a 'first action' or one or more 'subsequent actions' performed by the users in relation to the query and <average_amount_of_time_spent_on_page> represents an average amount of time spent by one or more users while browsing for information on a particular page of the website after performing the 'first action' and before performing the 'subsequent action' that navigated the users to the second page on the website. As an example, a fingerprint for a query may comprise fingerprint information such as <first query, 15 mins>, <re-formulation, 15 minutes>, <term addition, 10 minutes>, <exit, 0 minutes>.

In accordance with at least one embodiment, the query fingerprint information generation and classification service 230 may include a query fingerprint classification module 320. The query fingerprint classification module 320 may be configured to determine a classification for queries submitted by the users of the electronic marketplace based at least in part on the fingerprint information. In one embodiment, the classification of a query may be determined based at least in part on determining the duration of a search session related to the query, based on the time information in the fingerprint for the query. As an example, a relatively long search session may be indicative of multiple modifications of query terms by users during the search session whereas a relatively short search session may indicate fewer modifications to the query terms by users.

Accordingly, in one example, a query may be classified as a 'Broad Query' if the fingerprint information associated with the query indicates that the total number of actions in the fingerprint for the query and the total amount of time that the users stayed in the electronic marketplace website during the search session related to the query is within a first pre-determined threshold. In another example, a query may be classified as a 'Well-defined Query' if the fingerprint information associated with the query indicates that the total number of actions in the fingerprint for the query and the total amount of time that the users stayed on the electronic marketplace website during the search session related to the query is within a second pre-determined threshold. In other examples, a query may be classified as a 'Brand Query' if the fingerprint information associated with the query indicates brand-related information about the item (e.g., the name of a company which sells the item, product or service). In one embodiment, the pre-determined thresholds may be determined automatically by the electronic marketplace or may be specified by a user.

In other examples, a classification for a query may also be determined based at least in part on computing a similarity measure between the fingerprint information of the query and the fingerprint information of one or more other queries issued by the users of the electronic marketplace. As an example, the query fingerprint classification module 320 may be configured to compute the similarity measure between two queries by comparing the actions in the fingerprint information of the two queries and the order in which the actions appear in the fingerprint information. In accordance with at least one embodiment, the similarity measure may then be determined by assigning a value (e.g., such as 'high', medium' or 'low') to each query based on the comparison. The query fingerprint classification module 320 may be configured to classify queries having a similarity measure of 'low' under a first category, classify queries having a similarity measure of 'medium' under a second category and classify queries having a similarity measure of 'high' under a third category, and so on.

In certain embodiments, the query fingerprint information generation and classification service 230 may include a dynamic network content generation module 322. In some embodiments, the dynamic network content generation module 322 may be configured to determine a fingerprint for a query issued by a user and modify a user experience for the user based on the fingerprint. In one embodiment, the dynamic network content generation module 322 may be configured to perform one or more operations to receive a query issued by a user of a user device (e.g., 302, 304 or 306) and identify if fingerprint information exists for the query in the query classification database 116. If fingerprint information already exists for the query, the dynamic network content generation module 322 may determine a fingerprint for the query, and modify a user experience for the user based on the fingerprint. If fingerprint information does not exist for the query in the query classification database 116, then in some embodiments, the dynamic network content generation module 322 may perform one or more operations to access fingerprint information from the query classification database for a query that is similar to the user's query. As an example, a similar query may be defined as a query that may be classified under the same category as the query issued by the user in the electronic catalog. For example, a query (e.g., 'Men's Shoes') may be identified as a query that is similar to a query ('Shoes') submitted by the user, in certain embodiments. In one embodiment, the electronic marketplace may then perform one or more operations to determine a fingerprint for the query based on the fingerprint information and modify a user experience for the user based on the fingerprint.

In certain embodiments, the query fingerprint information generation and classification service 230 may be configured to determine a fingerprint for a query issued by a user based at least in part on combining the fingerprint information of one or more queries stored in the query classification database 116. As an example, consider that a user issues a query, 'Men's Running Shoes Size 10.' In one embodiment, the query fingerprint information generation and classification service 230 may determine that the fingerprint information for the query, 'Men's Running Shoes Size 10' exists in the query classification database 116 but is represented by a relatively small amount of data (e.g., the query was issued by a relatively small (1-2) number of users in the system and/or that the fingerprint information is representative of a relatively small (1-2) number of actions performed by the users). In this case, the query fingerprint information generation and classification service 230 may be configured to identify a similar query (e.g., 'Men's Running Shoes') stored in the query classification database 116 having a relatively large amount of data (e.g., the query was issued by a relatively large (>50) number of users in the system and/or that the fingerprint information is representative of a relatively large number (>5) number of actions performed by the users). In some embodiments, the query fingerprint information generation and classification service 230 may then be configured to determine a fingerprint for the query 'Men's Running Shoes Size 10' issued by the user by aggregating the fingerprint information of the query 'Men's Running Shoes Size 10' with the fingerprint information for the query, 'Men's Running Shoes.' Additional details of determining a fingerprint for a query issued by a user and modifying a user experience for the user based on the fingerprint is discussed in FIG. 6 and FIG. 7 below.

In accordance with at least some embodiments, the dynamic network content generation module 322 may be configured to dynamically change the appearance of network content in a network page of the electronic marketplace website as the user searches for information about an item in the electronic marketplace website, based on the fingerprint information. Modifying the user experience in some embodiments may include rendering collected network site data (e.g., hypertext markup language, cascading style sheets, programming language instructions such as scripting language instructions) into network document images that may be displayed dynamically on the network page of the electronic marketplace website. In other embodiments, modifying the user experience may also include generating interactive network document regions that may change an appearance of the network page based on the fingerprint information of the query. For example, a 'drop down' menu may be dynamically generated to change the appearance of a network page in response to a user's query and the fingerprint information of the query. As another example, a region with refined search results may be dynamically displayed on the network page based on the fingerprint of the query. As an example, if the dynamic network content generation module 322 determines that users who search for an item 'Games' typically re-formulate their query to 'Video games' based on the fingerprint information, the dynamic network content generation module 322 may automatically modify the search results presented by the user to include 'Video Games' in a top region of the network document when the user submits a query for the item 'Games.'

In certain embodiments, the dynamic network content generation module 322 may be configured to present a personalized search result to the user based on a query issued by the user and based on the fingerprint information related to the query. As an example, the dynamic network content generation module 322 may be configured to generate multiple views and/or layouts by which the user may view search results. For example, a personalized search result may include a search result that is presented in a particular layout and/or a view such as a 'list view', a 'grid view', an 'image view', and the like to the user. A personalized search result may include a search result that is presented in a particular layout and/or view to the user, based on the category of items in the search result, different products presented in the search result, and the like.

In some embodiments, the dynamic network content generation module 322 may be configured to present various categories of items related to the query issued by the user based on the fingerprint information and enable the user to navigate between the various categories of items within a given view and/or layout presented to the user in the search result. In embodiments, the views and/or layouts generated by the dynamic network content generation module 322 may identify a theme related to the query issued by the user and present various categories related to the theme in the search results.

In certain embodiments, the dynamic network content generation module 322 may be configured to present a subset of items related to a category of items in the search result, based on the fingerprint information of the query. As an example, the dynamic network content generation module 322 may be configured to organize the search results based on category, order the categories based on fingerprint information and identify a subset of items related to a subset of categories (e.g., the most popular categories) to present to the user in the search result.

Figure 4:
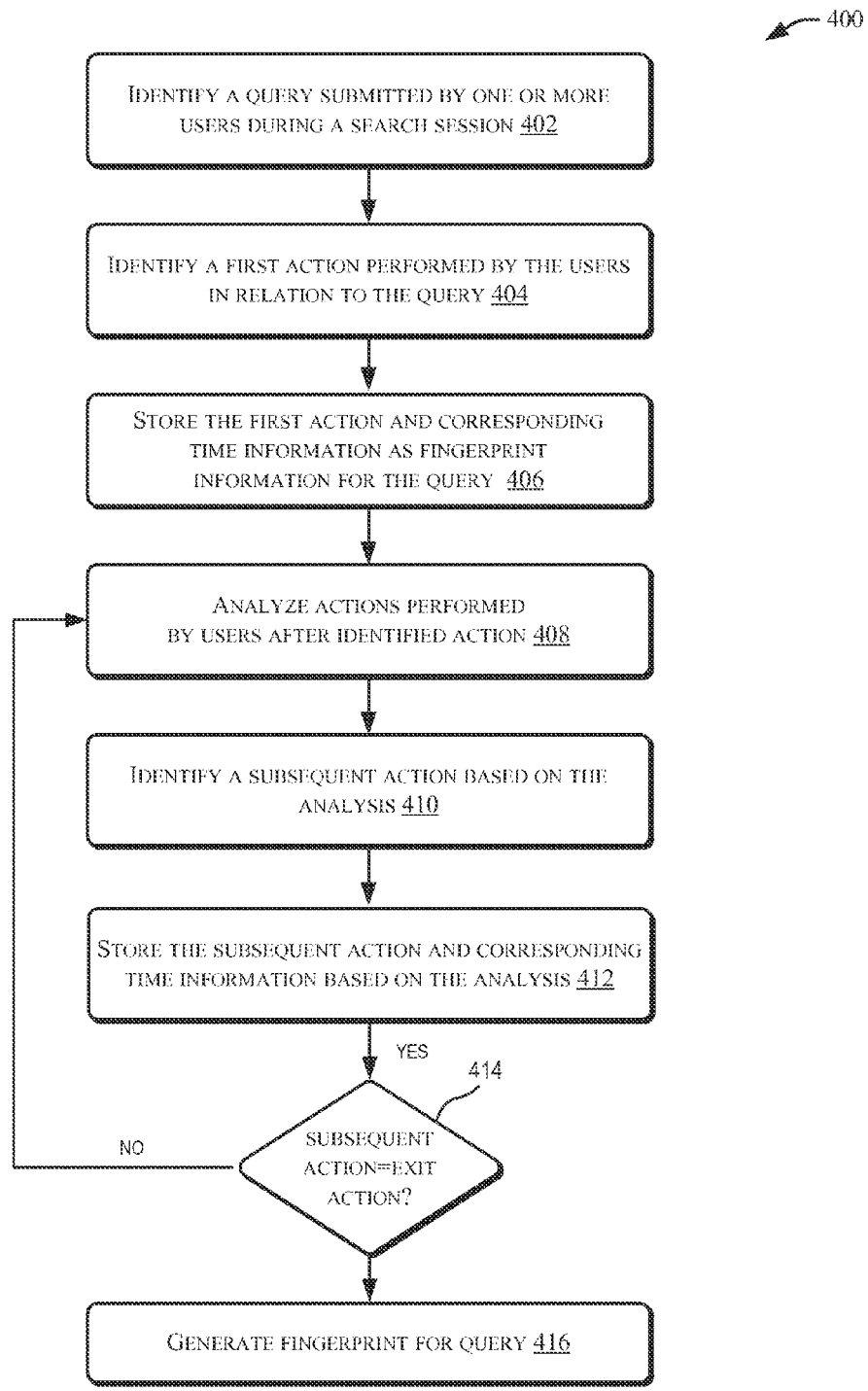
FIG. 4 illustrates a flow diagram of an example process 400 for generating a query fingerprint for one or more queries submitted by users of an electronic marketplace, described herein.
Figure 5:
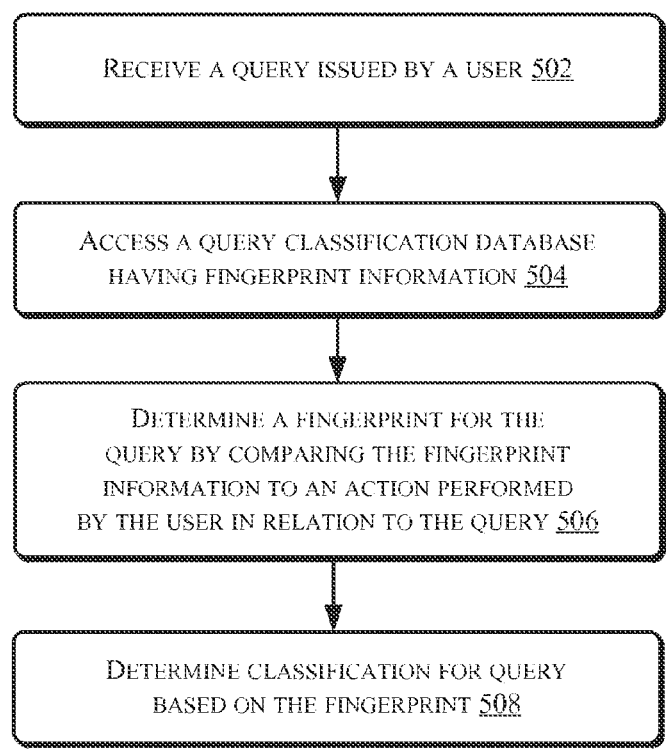
FIG. 5 illustrates a flow diagram of an example process 500 for evaluating fingerprint information for a query submitted by a user and classifying the query based on the fingerprint information, described herein.
Figure 6:
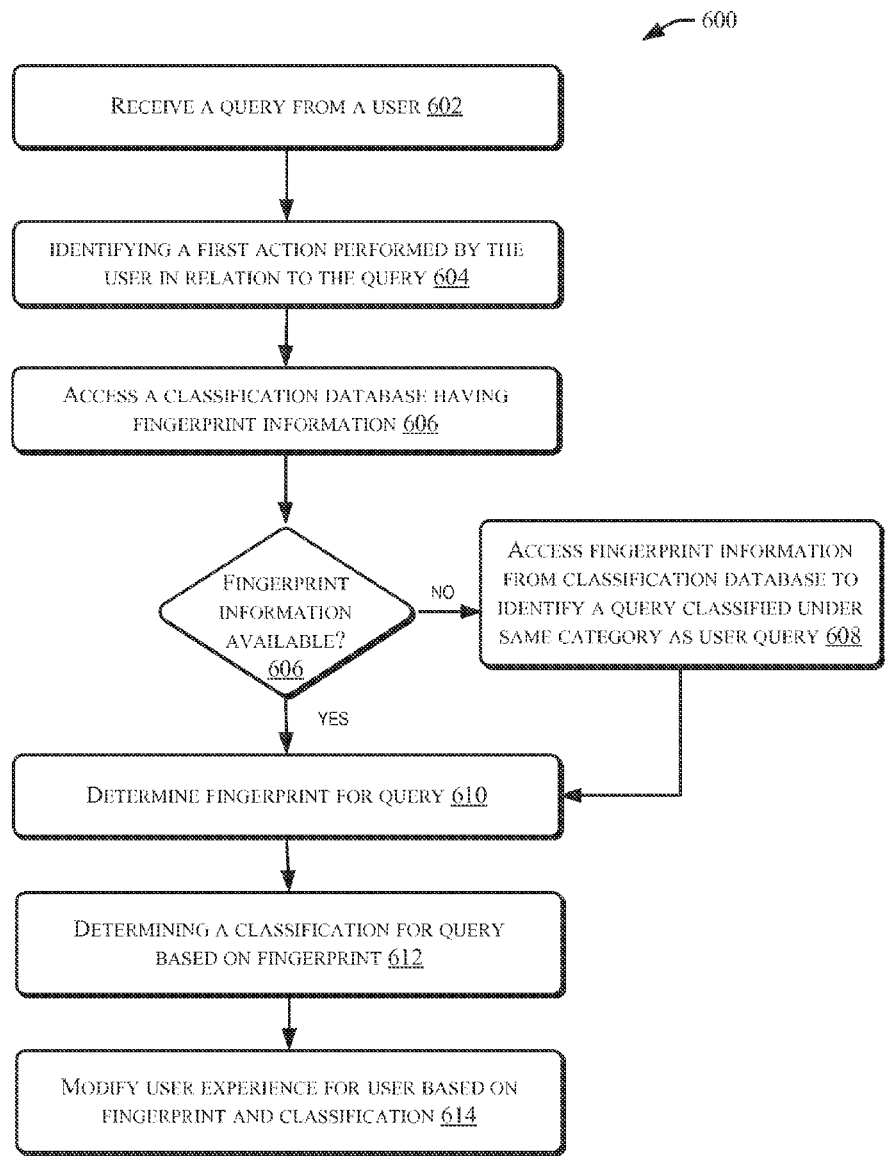
FIG. 6 illustrates a flow diagram of an example process 600 for modifying a user experience for a user for a query submitted by the user based on fingerprint information, described herein.

FIGS. 4-6 illustrate example flow diagrams showing respective processes 400, 500 and 600 for generating and classifying query fingerprints for queries submitted by users of an electronic marketplace, described herein. These processes are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program including a plurality of instructions executable by one or more processors. The computer-readable storage medium may be non-transitory.

In some examples, the query fingerprint generation and classification service 230 (e.g., utilizing at least the query fingerprint generation module 318, the query fingerprint classification module 320 and the dynamic network content generation module 322) shown in at least FIG. 3 (and others) may perform the processes 400, 500 and 600 of FIG. 4, FIG. 5 and FIG. 6 respectively.

FIG. 4 illustrates a flow diagram of an example process 400 for generating a query fingerprint for one or more queries submitted by users of an electronic marketplace, described herein. The process at 400 may begin at 402 by identifying a query submitted by one or more users during a search session. In one example, a query submitted by the users may be identified by accessing user search query histories stored in the user behavior database (e.g., 114). At 404, the process 400 may include identifying a 'first action' performed by the users in relation to the query. As discussed above, a 'first action' may correspond to a 'first query' or an 'initial query' (e.g., 'Shoes) submitted by the users. At 406, the process 400 may include storing the 'first action' as fingerprint information associated with the query in the query classification database 116. In some embodiments, the process at 406 may also include storing time information related to the identified action. As discussed above, the time information may correspond to an average amount of time that one or more users spent browsing for information on a particular page of the website after performing the 'first action' and before performing a 'subsequent action' that navigated the users to a second page on the website.

In some embodiments, at 408, the process 400 may include analyzing a plurality of actions performed by the users in relation to the query, after the identified action (e.g., 'first action'). At 410, the process 400 may include identifying a 'subsequent action' based at least in part on the analysis. At 412, the process 400 may include storing the 'subsequent action' and the time information associated with the 'subsequent action' as fingerprint information associated with the query in the query classification database 116.

At 414, the process 400 may include identifying if the 'subsequent action' corresponds to an 'exit action' performed by the users in relation to the query. In one embodiment, an 'exit action' may correspond to an abandonment of the query by the users or the end of the search session by the users. If the 'subsequent action' is indicative of an 'exit action', then in one embodiment, the process 400 ends at 416, by generating a fingerprint for the query that includes the identified actions. In one embodiment, and as discussed above, the fingerprint information for the query may be represented as a vector of features, in which each feature or attribute corresponds to an action performed by the user in relation to the query and may include time information associated with each action.

At 414, if it is determined that the subsequent action does not correspond to an 'exit' action, then the process 400 continues to 408 to analyze a plurality of actions performed by the users in relation to the query after the identified action.

FIG. 5 illustrates a flow diagram of an example process 500 for evaluating fingerprint information for a query submitted by a user and classifying the query based on the fingerprint information, described herein. The process at 500 may begin at 502 by receiving a query issued by a user of the electronic marketplace. At 504, the process 500 may include accessing a query classification database (e.g., 116) having fingerprint information. In some embodiments, at 506, the process 500 may include determining a fingerprint for the query by comparing the fingerprint information in the query classification database to an action performed by the user in relation to the query. As an example, an action may correspond to an 'initial query' (e.g., 'Shoes') submitted by the user. In one example, the process at 506 may include comparing search terms corresponding to a plurality of queries stored in the query classification database to the search term (e.g., 'Shoes') of the initial query issued by the user. If a search term of a query stored in the query classification database corresponds to the search term of the query issued by the user, then in some embodiments, the process at 506 may include obtaining the fingerprint information of the query stored in the query classification database to determine a fingerprint for the query issued by the user. If the search term of the query issued by the user does not correspond to one or more search terms of queries stored in the query classification database, then in some embodiments, the process at 506 may include obtaining the fingerprint information of a query in the query classification database that is similar to the query issued by the user. A similar query may be determined in various ways. As an example, a similar query may be defined as a query that may be classified under the same category as the query issued by the user in the electronic catalog. For example, a query (e.g., 'Footwear') may be identified as a query that is similar to a query ('Shoes') submitted by the user, in certain embodiments. In one embodiment, the process at 506 may then include determining a fingerprint for the query based on the fingerprint information. At 508, the process 500 may include determining a classification for the query based on the fingerprint.

FIG. 6 illustrates a flow diagram of an example process 600 for modifying a user experience for a user for a query submitted by the user based on fingerprint information, described herein. The process at 600 may begin at 602 by receiving a query submitted by a user of the electronic marketplace. At 604, the process 600 may include identifying a 'first action' associated with the query. As an example, the 'first action' may correspond to the 'first query' or the 'initial query' (e.g., 'Shoes') submitted by the user. At 606, the process 600 may include accessing the query classification database (e.g., 116) having fingerprint information. At 608, the process 600 may include identifying if fingerprint information is available for the query in the query classification database 116.

If fingerprint information already exists for the query, at 610, the process 600 may include determining a fingerprint for the query based on the fingerprint information. If fingerprint information does not exist for the query in the query classification database (e.g., 116), then in some embodiments, the process 600 may include accessing fingerprint information from the classification database (e.g., 116) to identify a query that is classified under a same category as the query issued by the user. As an example, if the user submitted a query ('Shoes') and it is determined that fingerprint information does not exist for the query ('Shoes') in the classification database, then, in some embodiments, the process 600 may access fingerprint information for a query ('Footwear') that is classified under the same category as the query ('Shoes') issued by the user.

At 612, the process 600 may include determining a classification for the query based on the fingerprint. As an example, the process 600 may determine that a query ('Shoes) issued by the user is a 'Broad query' based on the fingerprint information. In one embodiment, at 614, the process 600 may include modifying a user experience for the user based on the fingerprint information and classification. In some embodiments, modifying the user experience may also include identifying a 'subsequent action' based on the fingerprint for the query and dynamically changing the appearance of network content in a network page of the electronic marketplace website based on the 'subsequent action' and the classification of the query. As an example, the process at 614 may identify that a 'subsequent action' for a query, 'Shoes' submitted by a user is a re-formulation of the query based on the fingerprint. In one embodiment, the process at 614 may then perform an operation to dynamically change the appearance of network content in a network page of the electronic marketplace website to display search results related to 'Running Shoes' to the user. Additional details of the manner in which a user experience for a user may be modified based on fingerprint information is discussed in relation to FIGS. 7-9, described herein.

Figure 7:
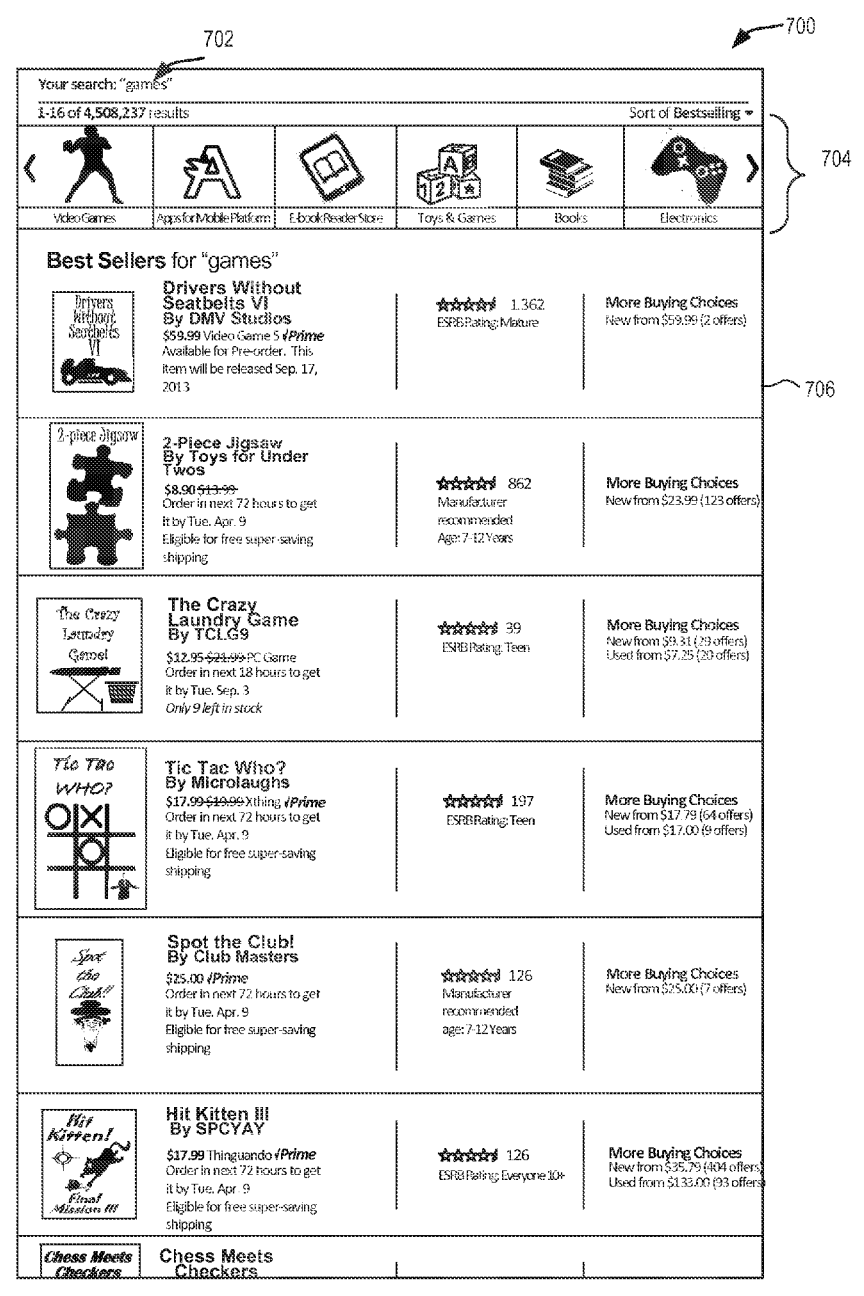

FIG. 7 is a schematic diagram depicting an example graphical user interface by which a user can search for an item within an electronic marketplace, described herein. In FIG. 7, the example environment 700 may be a graphical user interface viewable via a browser application (e.g., via the browser application 206) on the user's device. In the example illustrated in FIG. 7, the user submits a search query "Games" via the search query interface 702 provided by the electronic marketplace website. The electronic marketplace may then identify a subsequent action that the user is likely to perform in relation to the query 'Games' based on the fingerprint information stored in the query classification database. As an example, the electronic marketplace may determine that users who search for the item 'Games' typically re-formulate their query to 'Video games' based on the fingerprint information. In some examples, the electronic marketplace may also determine that the query 'Games' is classified as a 'Broad Query' in the query classification database based on the fingerprint information. In one embodiment, the electronic marketplace may dynamically modify the search results presented to the user to include various categories of 'Video games.' In the example illustrated in FIG. 7, the electronic marketplace modifies the search results presented by the user by dynamically generating and displaying a region 704 with refined search results of various categories of 'Video games' on a network page 706 to the user, based on the fingerprint information and the classification of the query.

Figure 8:
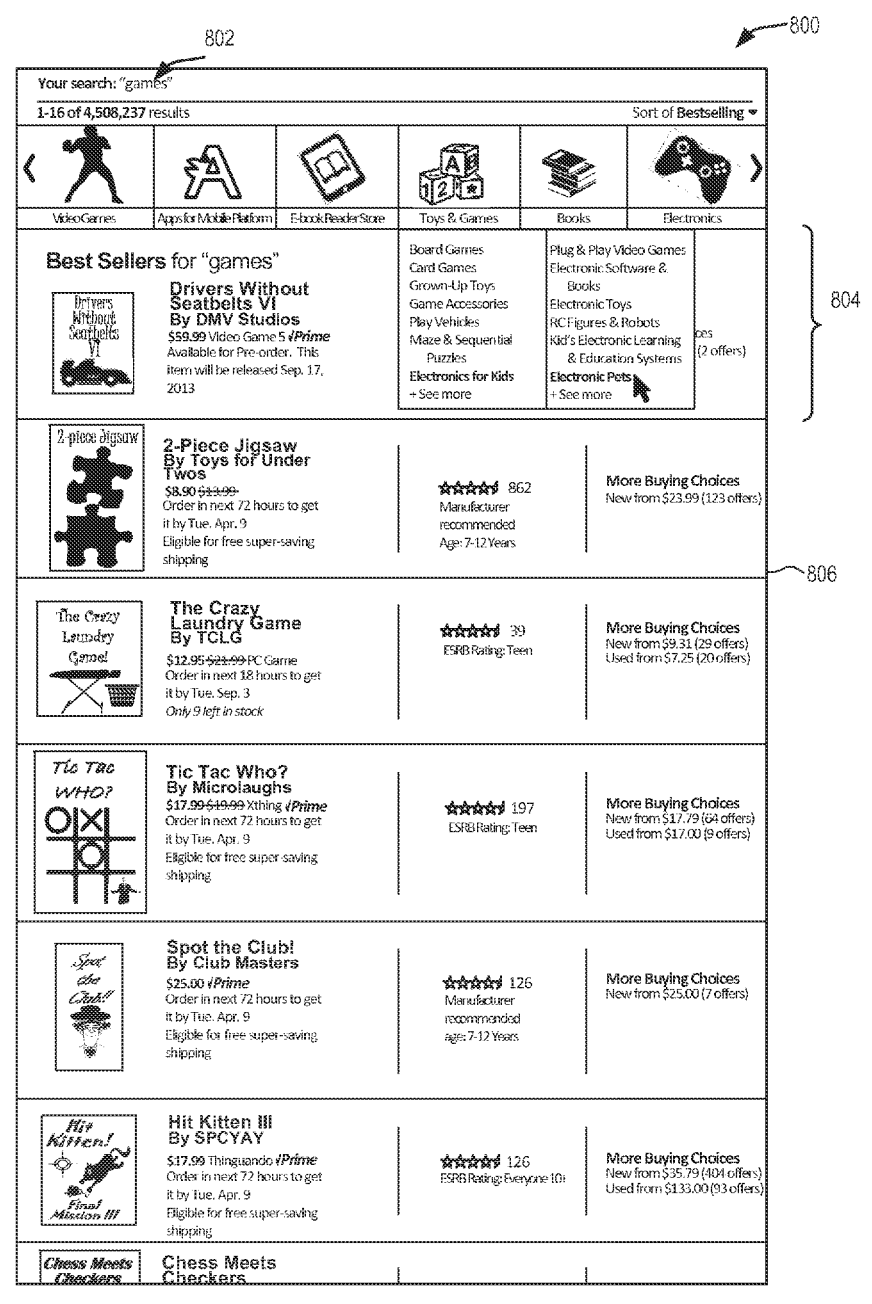

FIG. 8 is a schematic diagram depicting an example graphical user interface by which a user can search for an item within an electronic marketplace, described herein. In FIG. 8, the example environment 800 may be a graphical user interface viewable via a browser application (e.g., via the browser application 206) on the user's device. In the example illustrated in FIG. 8, the user submits a search query "Games' via the search query interface 802 provided by the electronic marketplace website. The electronic marketplace may then identify a subsequent action that the user is likely to perform in relation to the query 'Games' based on the fingerprint information and the classification of the query 'Games' from the query classification database. The electronic marketplace may then dynamically modify the search results presented to the user to include 'Video games.' In the example illustrated in FIG. 8, the electronic marketplace may modify the search results presented to the user by dynamically generating and displaying a 'drop down' menu 804 that changes the appearance of the network page 806 in response to the user's query and the fingerprint information of the query to display different categories of 'Video games' to the user.

Figure 9:
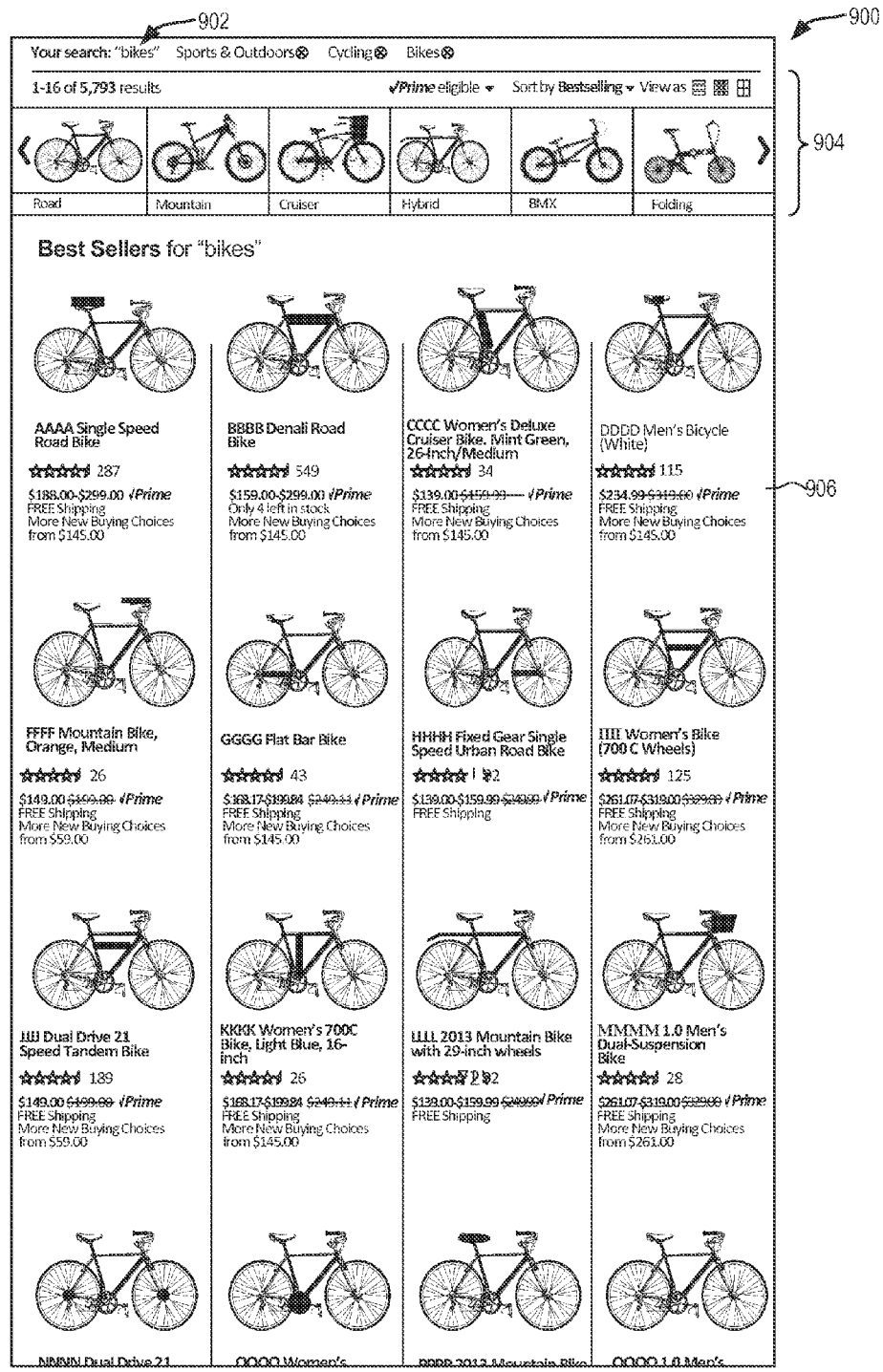
FIG. 9 is a schematic diagram depicting an example graphical user interface by which a user can search for an item within an electronic marketplace, described herein.

FIG. 9 is a schematic diagram depicting an example graphical user interface by which a user can search for an item within an electronic marketplace, described herein. In FIG. 9, the example environment 900 may be a graphical user interface viewable via a browser application (e.g., via the browser application 206) on the user's device. In the example illustrated in FIG. 9, the user submits a search query 'Bikes' via the search query interface 902 provided by the electronic marketplace website. The electronic marketplace may identify a subsequent action that the user is likely to perform in relation to the query 'Bikes' by accessing the fingerprint information and the classification of the query 'Bikes' stored in the query classification database. The electronic marketplace may then dynamically modify the search results presented by the user to include various types of 'Outdoor Bikes' as the user queries for the item 'Bikes' via the search interface. In the example illustrated in FIG. 9, the electronic marketplace may modify the search results presented by the user by dynamically generating and displaying a region 904 with refined search results of various categories of 'Outdoor Bikes' on the network page 906 to the user, based on the fingerprint information.

Illustrative methods and systems for the generation and classification of query fingerprints are described above. Some or all of these systems and methods may, but need not, be implemented at least partially by architectures such as those shown at least in FIGS. 1-10 above.

Figure 10:
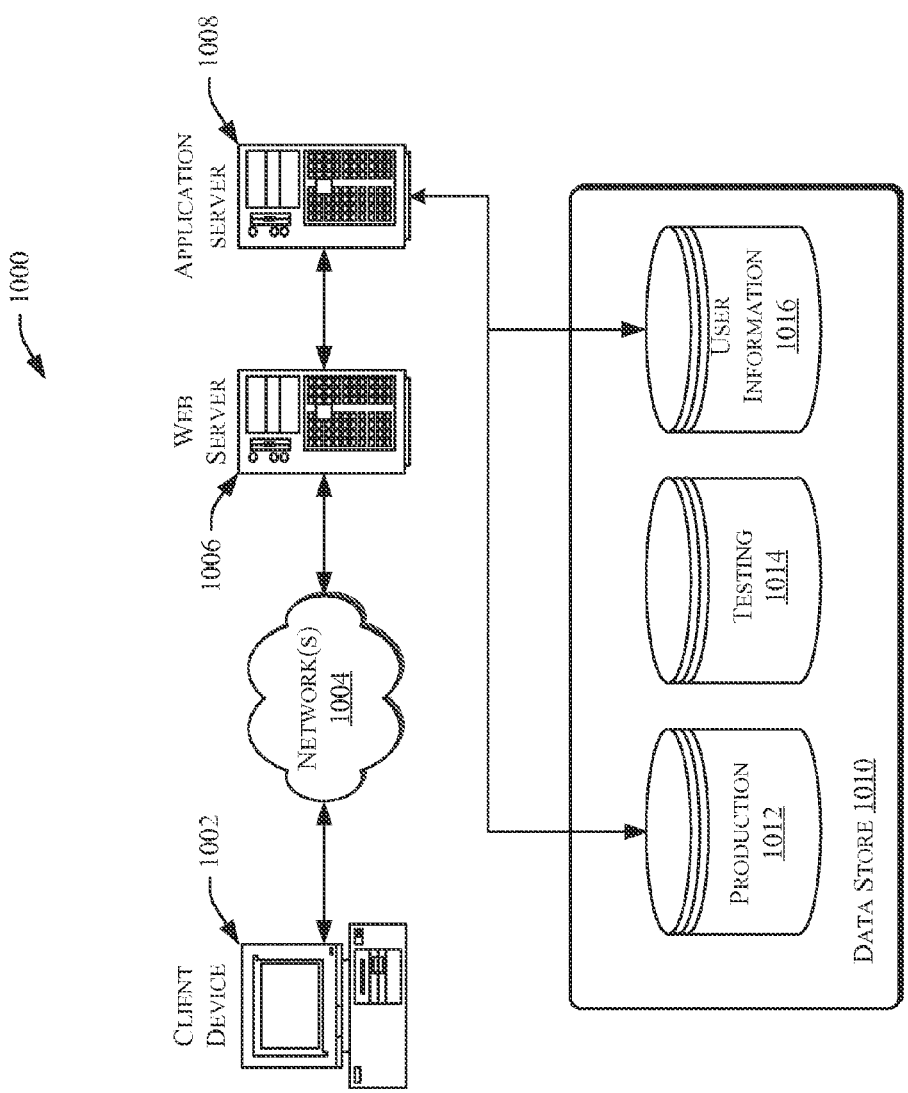
FIG. 10 illustrates aspects of an example environment 1000 for implementing aspects in accordance with various embodiments.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1116, which can be used to serve content for the production side. The data store also is shown to include a mechanism for storing log data 1014, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in accordance with at least one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   under the control of one or more computer systems configured with executable instructions,
   receiving an indication of a query issued by a user of a plurality of users of an electronic marketplace;
   processing the query to identify one or more actions performed by the user in relation to the query;
   generating fingerprint information for the query based at least in part on the one or more actions, the fingerprint information comprising a vector representative of the one or more actions performed by the user;
   accessing a database of fingerprint information, the database of fingerprint information comprising a plurality of fingerprints, each of the plurality of fingerprints comprising a vector representative of one or more actions performed by at least one of the plurality of users in relation to at least a second query; and
   determining a classification for the query based at least in part on the fingerprint information by comparing the vector to vector information included in the database of fingerprint information.

2. The computer-implemented method of claim 1, wherein processing the query further comprises identifying a first action performed by the user in relation to the query.

3. The computer-implemented method of claim 2, wherein processing the query further comprises identifying one or more subsequent actions performed by the user in relation to the query, after the first action.

4. The computer-implemented method of claim 1, wherein the one or more subsequent actions comprise at least one of a re-formulation of the query, a term swap, a term addition, a term deletion, an abandonment of the query, an item detail page click a refinement of the query or a scope change of the query.

5. The computer-implemented method of claim 1, wherein the fingerprint information comprises at least a first action and one or more subsequent actions performed by the user in relation to the query.

6. The computer-implemented method of claim 5, wherein the fingerprint information further identifies time information associated with at least the first action and the one or more subsequent actions.

7. The computer-implemented method of claim 6, wherein the time information comprises an amount of time spent by the user on the particular network page of the electronic marketplace website after performing at least the first action and one or more subsequent actions.

8. A computer-implemented method, comprising:
   receiving a query submitted by a user of an electronic marketplace;
   identifying one or more actions performed by the user in relation to the query;
   generating fingerprint information for the query based at least in part on the one or more actions, the fingerprint information comprising a vector representative of the one or more actions performed by the user;
   accessing a database of fingerprint information, the database of fingerprint information comprising a plurality of fingerprints, each of the plurality of fingerprints comprising a vector representative of one or more actions performed by at least one of a plurality of users in relation to at least a second query; and
   determining a classification for the query based at least in part on the fingerprint information by comparing the vector to vector information included in the database of fingerprint information.

9. The computer-implemented method of claim 8, wherein the one or more actions comprise a re-formulation of the query, a term swap, a term addition, a term deletion, an abandonment of the query, an item detail page click, a refinement of the query or a scope change of the query.

10. The computer-implemented method of claim 8, wherein the one or more actions comprise at least a first action and a subsequent action, the method further comprising storing at least the first action and the subsequent action related to the query in a query classification database.

11. The computer-implemented method of claim 10 wherein the subsequent action is identified as an action from a plurality of actions that is performed by a maximum number of users after the first action.

12. The computer-implemented method of claim 10, wherein generating the fingerprint information for the query further comprises computing an amount of time spent by the user on a particular network page of the electronic marketplace after performing at least the first action and the subsequent action.

13. The computer-implemented method of claim 12, wherein the classification for the query is determined based at least in part on the amount of time spent by the user on the particular network page of the electronic marketplace website after performing at least the first action and the subsequent action.

14. A computerized system, comprising:
one or more non-transitory computer-readable media collectively storing computer-executable instructions; and
at least one processor configured to access the non-transitory computer-readable media, the at least one processor configured to execute the computer-executable instructions to at least:
receive a query issued by a user of a plurality of users of an electronic marketplace;
process the query to identify one or more actions performed by the user in relation to the query;
generate fingerprint information for the query based at least in part on the one or more actions, the fingerprint information comprising a vector representative of the one or more actions performed by the user;
access a database of fingerprint information, the database of fingerprint information comprising a plurality of fingerprints, each of the plurality of fingerprints comprising a vector representative of one or more actions performed by at least one of the plurality of users in relation to at least a second query; and
determine a classification for the query based at least in part on the fingerprint information by comparing the vector to vector information included in the database of fingerprint information.

15. The computerized system of claim 14, wherein the at least one processor is configured to execute the computer-executable instructions to determine the classification for the query based at least in part on computing a similarity measure of the query with one or more other queries in a query classification database.

16. The system of claim 15, wherein the at least one processor is configured to execute the computer-executable instructions to compute the similarity measure based at least in part on accessing fingerprint information of the one or more other queries stored in the query classification database and comparing the fingerprint information of the one or more other queries to the fingerprint information of the identified query.

17. The system of claim 16, wherein the at least one processor is configured to execute the computer-executable instructions to compute the similarity measure based on comparing one or more actions in the fingerprint information of the one or more other queries with one or more actions in the fingerprint information of the identified query.

18. The system of claim 14, wherein the at least one processor is configured to execute the computer-executable instructions to determine the classification for the query based at least in part on computing a total amount of time spent by the user during a search session related to the query.

19. The system of claim 18, wherein the query is classified in a first category if a total number of actions performed by the user in relation to the query during the search session and the total amount of time spent by the user in the search session is within a first pre-determined threshold.

20. The system of claim 18, wherein the query is classified in a second category if a total number of actions performed by the user in relation to the query during the search session and the total amount of time spent by the user in the search session is within a second pre-determined threshold.

* * * * *